United States Patent [19]

Moulin et al.

[11] Patent Number: 4,485,068
[45] Date of Patent: Nov. 27, 1984

[54] INSTALLATION FOR STORING AND/OR TRANSFER OF DANGEROUS PRODUCTS

[75] Inventors: Maurice Moulin, Palaiseau; Jean Vivien, Les Clayes-sous-Bois, both of France

[73] Assignee: Commissariat a l'Energie Atomique, Paris, France

[21] Appl. No.: 272,005

[22] Filed: Jun. 9, 1981

[30] Foreign Application Priority Data

Jun. 13, 1980 [FR] France ............................ 80 13210

[51] Int. Cl.³ .................. G21C 19/06; G21C 19/32; G21C 19/40
[52] U.S. Cl. .................................................. 376/272
[58] Field of Search ............... 414/676, 236; 376/272, 376/265, 266, 262, 260, 261, 269, 385

[56] References Cited
U.S. PATENT DOCUMENTS

| 3,255,896 | 6/1966 | Sklorz | 376/272 X |
| 3,451,564 | 6/1969 | Haas | 414/236 |
| 3,554,389 | 1/1971 | Bright | 414/236 |
| 3,788,231 | 1/1974 | Bloomfield | 414/676 X |
| 3,940,577 | 2/1976 | Christofer | 191/12 R |
| 3,948,344 | 4/1976 | Johnson et al. | 414/676 X |
| 4,168,243 | 9/1979 | Gablin et al. | 252/301.1 W |
| 4,172,506 | 10/1979 | Terry | 180/125 |
| 4,298,083 | 11/1981 | Johnson et al. | 414/676 X |
| 4,366,114 | 12/1982 | Kuhnel et al. | 376/272 |

FOREIGN PATENT DOCUMENTS

| 2840559 | 3/1980 | Fed. Rep. of Germany . |
| 2433225 | 3/1980 | France . |
| 2023078 | 12/1979 | United Kingdom ............... 414/676 |

Primary Examiner—Richard E. Schafer
Assistant Examiner—Daniel Wasil
Attorney, Agent, or Firm—Kerkam, Stowell, Kondracki & Clarke

[57] ABSTRACT

Installation for the storage and/or transfer of dangerous products, wherein it comprises a storage enclosure defining at least one loading and unloading station and a plurality of storage stations, modules each of which receives the dangerous products such as fuel assemblies, each of these modules being located in one of the stations defined in the enclosure, the number of modules being less than that of the stations, lifting means for creating a fluid cushion below at least part of the modules in order to raise the latter within the enclosure and means for moving the modules between the different stations when they are raised by the lifting means.

15 Claims, 5 Drawing Figures

INSTALLATION FOR STORING AND/OR TRANSFER OF DANGEROUS PRODUCTS

BACKGROUND OF THE INVENTION

The present invention relates to an installation for the storage and/or transfer of dangerous products such as those presenting an irradiation hazard (radioactive waste, feed materials, sources, etc), or chemical contamination (plutonium, liquid effluents, etc) or such as explosives. More specifically, the invention relates in preferred manner an installation for the storage and/or transfer of irradiated fuel assemblies in the core of a fast neutron nuclear reactor.

It is known that irradiated fuel assemblies in the core of a fast neutron nuclear reactor are located in a tightly sealed sheath containing liquid sodium as soon as they are removed from the reactor cylinder, in order that the calories which the fuel continues to dissipate are removed under favourable conditions, despite the absence of storage in the reactor vessel. Another solution consists of transforming the assemblies under water or some other liquid (e.g. sodium.) after washing on leaving the reactor cylinder. It is also known that the irradiated fuel is reprocessed with minimum delay.

However, it may be necessary to provide for a provisional storage of the fuel assemblies, particularly when there is a difference between the time in which the reactor is put into operation and that in which the reprocessing plant is put into operation. Moreover, even when the reactor and reprocessing plant are both operating, the storage of the irradiated assemblies awaiting reprocessing is virtually indispensible due to the significant difference between the removal speeds from the reactor cylinder during an irradiated fuel replacement phase and the reprocessing possibilities of the reprocessing plant.

As the reprocessing plant is not in principle installed on the site on the reactor, it is possible to store the irradiated fuel on the same site as the reactor or on the site of the reprocessing plant. Technical problems are simplified by the first solution which makes it possible to defer the assembly transportation operations, thus reducing costs. For this reason, the storage installation according to the invention is preferably located on the site of the reactor. However, this location is not limitative and it is to be understood that the invention also covers the case when the storage installation is located on the site of the reprocessing plant.

BRIEF SUMMARY OF THE INVENTION

The present invention therefore relates to an installation for the storage and/or transfer of dangerous products, wherein it comprises a storage enclosure defining at least one loading and unloading station and a plurality of storage stations, modules each of which receives the dangerous products such as fuel assemblies (exposed or in sheets) each of these modules being located in one of the stations defined in the enclosure, the number of modules being less than that of the stations, lifting means for creating a fluid cushion below at least part of the modules in order to raise the latter within the enclosure and means for moving the modules between the different stations when they are raised by the lifting means.

According to a secondary feature of the invention, the loading and storage stations are aligned in rows in accordance with two different directions, the lifting means acting independently in each of the said rows, and the means for moving the modules acting simultaneously on all the modules of the same row.

According to a particular embodiment of the invention, the loading and storage stations are aligned in rows in two orthogonal directions, the storage enclosure then being rectangular and the module square.

Preferably, means are provided for guiding the modules during their movements between the different stations. When these stations are aligned in rows, these module guidance means can comprise guide rails located on the periphery of the storage enclosure and between certain of the rows, except at each of the ends of the rows, and lateral rollers located on each module to cooperate with the guide rails and with adjacent modules.

Preferably, the means for moving the modules are constituted by jacks located outside the enclosure at least at one end of at least part of said rows.

According to another secondary feature of the invention, the lifting means comprise parallel pipes arranged level with the base of the enclosure and incorporating uniformly distributed support nozzles, the pipes being supplied with a pressurized fluid such as gas or liquid.

When the installation is a fuel assembly storage installation located on the site of the reactor, it is important to provide a circuit making it possible to remove the calories diffused by the fuel assemblies. This circuit can be supplied in preferred manner by a cooled fluid such as gas or liquid.

According to another secondary feature of the invention, each module then comprises an upper plate, means for supporting the fuel assemblies, a lower plate whose lower face is flat so as to permit the lifting of the module by the lifting means and an intermediate ferrule surrounding the fuel assemblies and defining in the vicinity of each of the plates a passage enabling the cooled fluid to enter and leave the module.

BRIEF DESCRIPTION OF THE DRAWINGS

The invention is described in greater detail hereinafter relative to non-limitative embodiments and the attached drawings, wherein show:

FIG. 2 a sectional view along a horizontal plane of the storage installation of FIG. 1 diagrammatically illustrating the arrangement of the modules within the enclosure and their movement within the latter.

FIG. 3 a sectional view along line III-III of FIG. 2 showing the lower part of the storage installation and particularly the cooperation between the individual modules and with the sidewalls of the enclosure by means of guide rollers.

FIG. 4 a part sectional side view showing on a larger scale one of the modules of the storage installation of FIGS. 2 and 3.

FIG. 5 a sectional view along line V—V of FIG. 4.

DETAILED DESCRIPTION OF THE PREFERRED EMBODIMENTS

Figure 1:
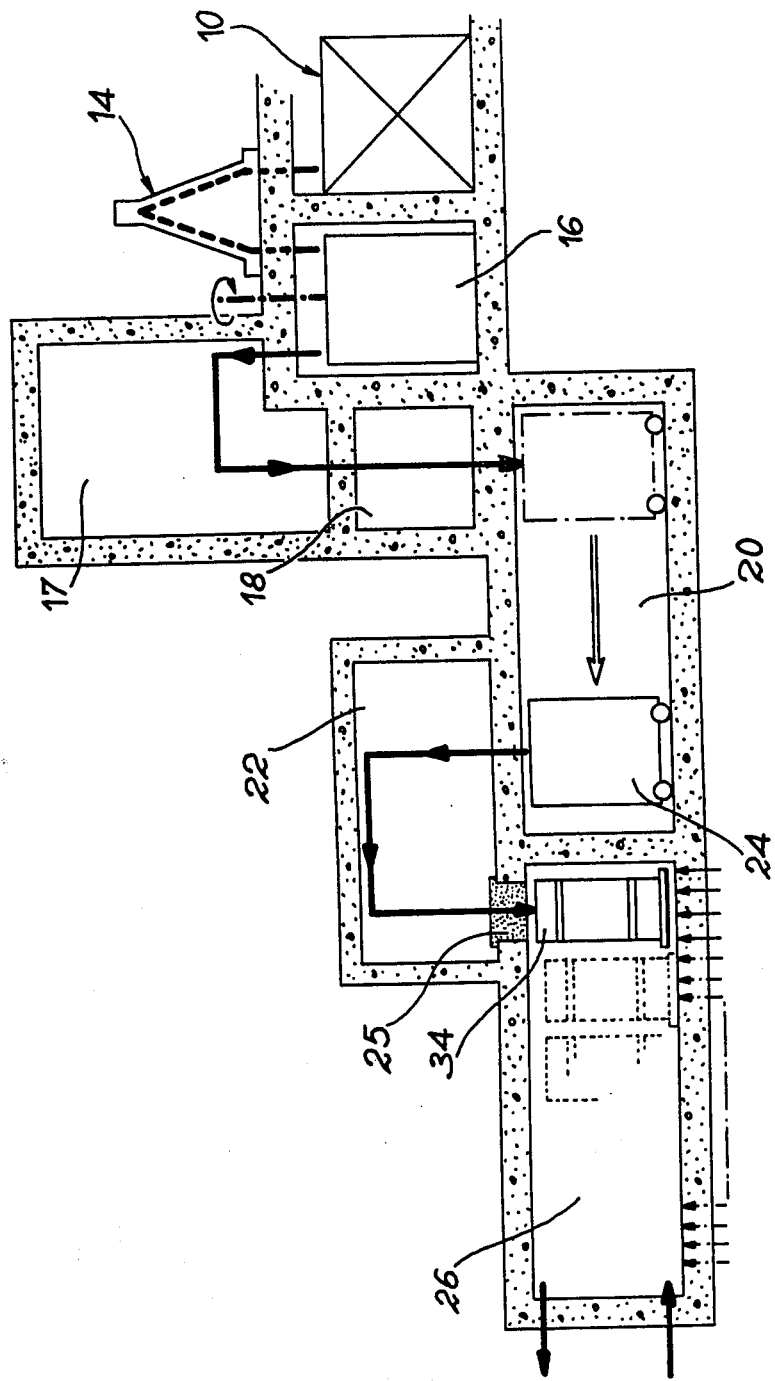
FIG. 1 is a diagrammatic sectional side view of the location of a storage installation according to the invention on the site of a fast neutron nuclear reaction.

The handling and storage of irradiated assemblies removed from a fast neutron reactor involves certain precautions to prevent the rods containing the fuel from exceeding the maximum thermal conditions imposed and which are generally a few hundred ° C. on the sheath. Account must also be taken of the fact that the residual power of an assembly decreases exponentially in time after it has been removed from the reactor.

As is diagrammatically shown in FIG. 1 and in accordance with a known process for the extraction of irradiated assemblies, initially said assemblies are extracted from the core of reactor 10 by means of a not shown raking means and they are then transported by means of a hod 14 into a cylinder 16 containing liquid sodium like the vessel of reactor 10. It is pointed out that sodium is an excellent heat transfer agent, whose low steam pressure and melting temperature make it possible to provide unpressurized reservoirs, which are still insulated from the atmosphere by inert covering gases 5.

When the cylinder 16 is filled with irradiated assemblies, it must be emptied to enable the loading of the reactor with new assemblies and which are transferred into the same to replace the irradiated assemblies which have been removed. According to a preferred procedure shown in FIG. 1, the irradiated assemblies are removed by means of a handling shoot 17 to a conditioning room 18 in which they are placed in sheaths, said room being cooled by a nitrogen flow. A transfer shoot 20 is in part positioned below the conditioning room 18 and in part below the handling room 22. This transfer shoot 20 contains a transfer hod 24, which receives the sheets containing the fuel assemblies. This transfer shoot is coded by an air or nitrogen flow. The transfer hod 24 makes it possible to transport the irradiated assemblies in their sheaths to the handling room 22, which is also cooled by a nitrogen flow and in which the fuel assemblies are conditioned in caskets permitting the transfer thereof to the site of the reprocessing plant.

The different elements of the installation described hereinbefore, as well as the operations which they perform are well known to those skilled in the art and will not be described in detail.

According to the present invention, the handling room 22 is used only for transferring the irradiated assemblies in their sheaths from transfer shoot 20 to a storage installation 26 constructed according to the invention.

Before describing the storage installation 26, it is pointed out that on the one hand this installation is not necessarily located on the site of the reactor as has been stated hereinbefore and on the other that the location of said storage installation on the site of the reactor could also take place in some other way, in particular by positioning the said installation directly below the conditioning room 18. Thus, transfer shoot 20 and handling room 22 are in principle intended for the conditioning of irradiated assemblies in caskets permitting their transportation to the site of the reprocessing plant. The arrangement of FIG. 1 is merely intended to permit the adaptation of the storage installation 26 to an existing irradiated fuel removal installation.

As can be gathered more particularly from FIGS. 2 and 3, storage installation 26 comprises a concrete confinement enclosure 28 ensuring the biological protection of the environment. Confinement enclosure 28 is in the form of a rectangular parallelepiped defining in cross-sectional manner and in the way shown in FIG. 2 a certain number of stations $P_s$ and $P_c$ with a square cross-section. In a first direction, they are arranged in two rows 30a and 30b of four stations and in a second direction, which is perpendicular to the first, in four rows 32a, 32b, 32c and 32d of two stations. It is pointed out that the number of stations in the storage installation can differ from that shown in the drawings and in particular that the number of rows of type 30 and 32 can be the same (e.g. 4 or 5) or the number of rows of two stations of type 32 can be higher or lower than 4. In addition, the square cross-section of each of the stations is not limitative and can in particular be rectangular or in the shape of a lozenge or parallelogram, the cross-section of enclosure 28 also then being in the shape of a parallelogram.

Station $P_c$, defined at the intersection of rows 30a and 32d in the represented variant, is located below a trapdoor 25 formed in the ceiling or top of the enclosure and communicating with the handling room 22. Thus, station $P_c$ permits the loading and unloading of storage installation 26. According to a not shown constructional variant, the loading and unloading of the storage installation can take place with two different stations both located in the manner of station $P_c$ below a trapdoor formed in the top of enclosure 28 and communicating with an appropriate handling room like room 22. All the other stations defined within enclosure 28 constitutes storage stations $P_s$.

According to the invention, if the total number of stations $P_c$ and $P_s$ defined within enclosure 28 is n (8 in the represented embodiment) n−1 modules 34 are placed within confinement enclosure 28. The modules 34, which will be described in greater detail hereinafter, are all identical and each of them normally occupies one of the stations $P_s$, station $P_c$ being left free for loading and unloading. Obviously, the number of modules 34 could be less than n−1 and then certain of the storage stations $P_s$ would be empty. However, it is pointed out that the capacity of storage installation 26 relative thereto would be reduced, which is obviously not desirable.

As will be shown hereinafter, each of the modules 34 is able to receive a number of sheaths containing irradiated fuel assemblies. Each empty or full module 34 can also be removed from enclosure 28 by the trapdoor made in the top or ceiling above station $P_c$. In order to permit the loading and unloading of the modules in sheaths, as well as the extraction and installation of the modules if this proves necessary, a per se known, not shown handling raking means is placed in handling room 22 above the trapdoor ceiling station $P_c$.

According to the invention and due to the fact that at least one of the stations defined within enclosure 28 is empty, it is possible to move modules 34 within the enclosure so as to bring them in turn level with the loading and unloading station $P_c$, so that they can receive the sheets containing the irradiated assemblies or, conversely, to enable said assemblies to be removed to permit their conditioning in a per se known casket when their transportation to the reprocessing plant can be envisaged. This movement of modules 34 is made possible by the presence of lifting means diagrammatically indicated at 36 in FIG. 3 level with the base of enclosure 28 and by the presence of means for moving the modules between the different stations, such as jacks 38, able to move modules 34 when the latter are raised by light means 36.

Obviously, the jacks 38 can be replaced by any equivalent means making it possible to move the modules between the different stations, although the use of jacks offers the advantage of enabling work to be carried out thereon from the outside. However, solutions based on a thrust chain or a drive by cables or chains and pins are also possible.

The lifting means 36 comprise a not shown piping system, which can be embedded in the concrete constituting the floor or base of enclosure 28 or can be positioned on the latter when modules 34 do not rest directly thereon and instead rest on horizontal beams. This piping system is constituted by a plurality of assemblies or parallel pipes arranged on the one hand below each of the rows 30a and 30b and on the other below two rows 32a and 32d arranged on the periphery of enclosure 28. These pipes are supplied by a pressurized fluid issuing into the enclosure 28 by means of a large number of vertically axed lifting nozzles or jets 40 (FIG. 4). The nozzles 40 are positioned as close together as possible to permit a correct lift of modules 34. Thus, if they are cylindrical, hexagonal or triangular they are arranged with a triangular pitch, whereas if they are square, they are arranged with a square pitch. The arrangement of the nozzles 40 over part of the bearing surface of modules 34 which is as large as possible makes it possible to ensure a correct lifting thereof, no matter what their load.

Preferably, when the fluid used is a gas, the nozzles or jets 40 are in the form of sonic necks. In per se known manner, the sonic necks have the essential feature of ensuring a constant gas flow when the upstream pressure is constant and independently of the downstream pressure. In the present case, it is obvious that this feature is particularly interesting because it makes it possible to ensure a correct lift of modules 34, in spite of the fact that certain of the nozzles 40 are not covered by any other module.

Preferably, the groups of parallel pipes of the piping system 36 ensuring the lifting of the modules located in each of the rows 30a, 30b, 32a and 32d are supplied independently of one another. As shown in FIG. 3, this feature makes it possible to raise the module or modules 34 arranged in the corresponding row in order to permit the displacement thereof by means of the corresponding jack 38, whilst maintaining the other modules 34 in the stations $P_s$ or $P_c$ which they occupy, said other modules then resting by gravity on the floor of enclosure 28. Through the use of this gravity action, the reciprocal friction ensures a good lateral hold of the modules in the case of earthquakes.

As can particularly be seen from FIG. 2, there are preferably four jacks or four groups of jacks 38-1, 38-2, 38-3 and 38-4 positioned externally of the confinement enclosure 28 so as to act across said enclosure by their push rods 38a on the module or modules 34 located in each of the peripheral rows 30a, 30b, 32a and 32d. More specifically, one jack or groups of jacks 38 is located at one of the ends of each of these peripheral rows, said end being selected in such a way that the consecutive putting into operation of jacks of adjacent peripheral rows makes it possible to move the group of modules in a predetermined rotation direction within the peripheral rows. In addition, the push rods 38a of each of the jacks exert a pressure action on the closest module 34 of the corresponding row, the movement of said module being imparted to the other modules of the row, if other modules are provided. In the variant shown in FIG. 2, the successive operation of jacks 38-1 to 38-4 makes it possible to move all modules 34 in a counterclockwise direction within enclosure 28. Thus, the operation of jack 38-1 makes it possible to move module 34 arranged in row 32d in the direction of the arrow up to the loading and unloading stage $P_c$. This movement obviously takes place following the operation of that part of the pressurized fluid circuit 36 corresponding to row 32d, which is then depressurized and the rotation of modules 34 between the different stations defined within enclosure 28 continues by means of jack 38-4. The operation of this jack is accompanied by a pressurization of that part of the circuit 36 corresponding to row 30b. It is then jack 38-3 which is operated, following the pressurization of that part of the lifting circuit 36 corresponding to row 32a. Finally, the rotation of modules 34 is completed by the operation of jack 38-2 accompanied by a pressurization of that part of lifting circuit 36 corresponding to row 30a. The complete cycle described hereinbefore corresponds to the movement of each of the modules 34 contained in enclosure 28 between two adjacent stations in a counterclockwise direction. The repetition of this cycle makes it possible to successively move all the modules 34 into station $P_c$, where they can be loaded and unloaded at random. Thus, it is possible by displacing the modules, to check by any known means (visual, eddy currents, etc.) the state of the modules stored in the single fixed station constituted by station $P_c$.

Obviously, the arrangement of jacks 38 could be reversed, whereby each of the jacks would then be positioned at the opposite end of the corresponding row in such a way that the rotation of the modules 34 within enclosure 28 would take place in a clockwise direction.

Moreover, the course of the modules is not limited to that described, although it gives the best filling coefficient, Thus, it may also vary with the configuration of enclosure 28 and the internal partition thereof.

As all the modules 34 are identical, one of them will be described with reference to FIGS. 4 and 5.

Each module 34 essentially comprises three superimposed parts enabling them to vertically support a certain number of sheaths 41 containing the irradiated fuel assemblies. Thus, each storage module 34 comprises, when starting from the top, a ribbed horizontal supporting plate 42 supporting sheaths 41, an intermediate member 44 making it possible to channel the flow of a cooling gas such as nitrogen, in the manner to be described hereinafter and prevent rocking or swinging of sheaths particularly in the case of earthquakes, and a horizontal lower plate 46 having a level lower face 48 enabling the lifting of module 34 by means of nozzles 40. The three parts 42, 44 and 46 are spaced from one another and rendered integral by means of six feet 50 fixed e.g. by welding to the centre of each of the faces of the intermediate member 44. The latter defines a ferrule or funnel having a hexagonal shape as shown in FIG. 5. The opposite ends of feet 50 are fixed respectively to plate 42 and plate 46, e.g. by welding.

In plan view, supporting plate 42 also has a hexagonal shape and its sides are located in the extension of the corresponding faces of intermediate member 44. Plate 42 has holes 52 regularly distributed in directions parallel to each of the sides of the hexagon and permitting the passage of sheets 41. Only the centre of plate 42 is not perforated, because it has a recess 54 able to receive an appropriate gripping system manipulated by a raking means, which enables the modules to be introduced into enclosure 28 by the trapdoor made in the top thereof or to remove them therefrom in the manner indicated hereinbefore. For information, in the embodiment shown in FIG. 5, the supporting plate 42 has 18 holes 52 which make it possible to receive 18 sheaths 41. Moreover, the supporting plate 42 is provided above each of the holes 52 with a drop or fall absorber 56 having on its upper end a support 58 on which is suspended the corresponding sheath 41. The absorber 56, constituted e.g. by a perforated tube, makes it possible to limit the slowing down force of sheath 41 by limiting the deceleration to 10 g in the case of an accidental jettisoning of a loaded sheath.

The funnel or ferrule-shaped intermediate member 44 is surrounded in its upper part by a square frame 60, whose sides substantially correspond to the maximum overall dimension of the module, i.e. to the dimensions of stations $P_s$ and $P_c$ defined within enclosure 28. Frame 60 is fixed by welding to two feet 50 and to two opposite apices of the hexagon formed by ferrule 44. At two different levels, ferrule 44 also supports intersecting bars 62 arranged parallel to certain of the faces of the ferrules. The function of the bars 62 is to prevent rocking or swinging of sheaths 41 in the case of an earthquake.

Lower plate 46 has peripheral edges 64 which, in plan view, define a square, whose sides are aligned with those of frame 60. Thus, lower plate 46 defines a tightly sealed reservoir able to receive sodium which may have escaped from one or more sheaths 41. As shown in FIGS. 3 and 4, in the embodiment described plate 46 is provided with four rollers 66 at each of its angles. More specifically, rollers 66 located at the ends of two opposite sides of the square defined by plate 46 are positioned at two different levels in such a way that hereinafter they will be called lower rollers 66a and upper rollers 66b. The modules 34 are placed within enclosure 28 in such a way that the sides of the modules carrying the rollers of the same level are parallel to the small sides of the rectangle defined by the enclosure and that the facing rollers of two adjacent modules of each of the rows 30 are at two different levels. As a result of this arrangement and as illustrated more particularly in FIG. 3 in which the scale has been deliberately increased in the heightwise direction in order to facilitate understanding, the modules 34 of the same row are in contact with one another by means of lower rollers 66a, which bear against the edges 64 of the lower plate 46 of the adjacent module. This structure enables the lower rollers 66a of module 34 displaced by jack 38-1 to roll on edges 64 of the modules arranged in row 32c and for edge 64 of module 34 displaced by jack 38-3 to roll on the lower rollers 66a of modules 34 arranged in row 32b without the upper rollers 66b impairing this movement, even when modules 34 are raised by the pressurization of the corresponding part of lifting circuit 36.

Running rails 68 are also provided within enclosure 28 to cooperate with rollers 66 in order to guide modules 34 in their displacement. These rails 68 are arranged on the one hand along the vertical walls of enclosure 28 level with rollers 66 and on the other hand in the centre of enclosure 28 between rows 30, except at the level of the two end rows 32a, 32d in order to permit the displacement of modules 34 in these two rows. It is clear that these rails 68 on which roll rollers 66 make it possible to guide modules 34 when they are moved between two stations $P_s$ and $P_c$ under the action of jacks 38.

Obviously, the lateral guidance of the modules can be obtained by any other means. Thus, it is possible to use guide blocks in place of rollers 66 or to create a fluid cushion comparable to that ensuring the lift of the modules.

As has been stated, the fuel assemblies to be stored reach the storage installation 26 in a relatively short time when the latter is directly installed on the site of the reactor. It is appropriate in this case to provide a cooling circuit making it possible to remove the calories which continue to be dissipated by the irradiated assemblies.

According to another feature of the invention, this cooling circuit is a cooled gas and preferably nitrogen circuit. For the installation of this cooling circuit, the storage installation room preferably occupies a central position between two gallery bays separated from the storage room by concrete walls, whose thickness ensures the biological protection. These gallery bays make it possible on the one hand for personnel to move about and on the other the installation of the cooling gas circulation sheaths. This not shown nitrogen circuit operates in two closed loops. The first of these loops is defined between the actual storage installation and a group of exchangers of a freon refrigerating unit. This refrigerating unit is itself enclosed in a circuit with its condenser and thus defines the second loop. The condenser exchanges its calories with the atmospheric air or with a heat recovery device. Preferably, the cold nitrogen enters from the bottom of the room and particularly by means of openings made in the vertical walls of enclosure 28 level with spaces defined between the lower plates 46 and the ferrules 44 of modules 34. The cold nitrogen rises within the funnels or ferrules 44 in order to cool the fuel assemblies contained in sheaths 41 and leaves by spaces defined between ferrules 44 and the support plates 42 of the modules. The hot nitrogen escapes by other openings made, for example, in the top or ceiling of the enclosure in order to reach the exchangers of the refrigerating unit.

Preferably, extra cooling circuit machines are provided, so that in the case of a mechanical or electrical fault, compensation thereof is brought about by putting into operation standby machines or by starting up electricity generating machines. The valves then assure the connection of the storage installation to the operating machines and isolate effective machines.

By means of the storage installation 26, whereof an embodiment has been described with reference to the drawings, it is possible to store on the actual reactor site the irradiated assemblies extracted from the reactor core by successively passing an adequate number of empty modules 34 level with the loading station $P_c$. The modules are displaced by means of jacks 38 after raising the modules 34 to be moved by pressurizing the corresponding part of the lifting means 36. Each of the modules 34 arriving at the loading station $P_c$ in the represented embodiment receives 18 sheaths 41 before being replaced by a new empty module. When the fuel assemblies in their sheaths have to be removed to the reprocessing plant, the loaded modules 34 are brought to the unloading station $P_c$ in order to remove the sheaths containing the assemblies, e.g. by means of a racking means equipped with a drag hook.

Obviously, the number of modules 34 and storage stations $P_s$ can differ significantly from the example shown in FIG. 2. The numbers will mainly be chosen as a function of needs, i.e. taking account both of the storage duration prior to transferring the assemblies to the reprocessing plant, the gap between two reactor loading operations, the number of assemblies extracted from the reactor core during each of these operations and the number of assemblies received in each of the modules. The dimensions of the storage installation 26 still remain limited as a function of the maximum thrust which can be exerted by the jacks or groups of jacks 38. If the storage capacity of enclosure 28 is inadequate to meet these requirements, it is possible to juxtapose a plurality of such enclosures having a common wall and optionally a single loading station.

According to the second embodiment of the invention (not shown), the installation ensuring the storage and/or transfer of the irradiated fuel assemblies can be constituted by a pool filled with a liquid such as water or sodium. The installation is then very similar to that described hereinbefore with reference to the attached drawings, as will be apparent from the following brief description.

As in the previous embodiment the assemblies extracted from the reactor core are transferred into a cylinder under sodium. Following a partial decrease in their residual power, the assemblies are taken up again in the cylinder by handling means placed in a handling chute like chute 17 in FIG. 1. They are then fed into a washing station where traces of sodium deposited on their structure are removed, this being followed by a rinsing process. An advantageous solution consists of using the washing installation as a "sieve" between the sodium-polluted handling chute and the part of the installation which is under water. The assemblies are removed from the washing installation by the lower end thereof. They are then either placed in a machine which transfers them to the pool or are placed directly in the latter if it can be located at this point.

Contrary to the first embodiment, the assemblies are then introduced into modules without sheaths. This leads to a slight modification to the modules permitting them to support the assemblies, no longer by the top, but instead by the lower shoulder constituting the base on a support grid with the interpositioning of a drop absorber. Earthquake-resisting gratings are then positioned towards the top of the modules in order to guide the assemblies during their removal.

Otherwise, the operation of the modules and their arrangement within the storage installation are identical to the aforementioned function and arrangement of the storage modules in the gaseous medium.

Obviously, the arrangement of the modules in a liquid such as water or liquid sodium does not permit the use of lifting means creating a gas cushion below the modules. This gas cushion is replaced by a liquid cushion created by means of injectors (e.g. using water) placed on the bottom of the pool and connected to a supply pipe, which can particularly take up water from the upper part of the pool. Pressurization is brought about by a pump located outside the pool or embedded.

As in the first embodiment, the handling means can be constituted by jacks arranged so that they can be repaired or replaced outside the pool. In order to bring about uniformity, these jacks are preferably water-controlled.

The removal of the heat given off by the assemblies in the water of the pool takes place in conventional manner to a secondary circuit via a water - water exchanger. This heat can be discharged into the atmosphere by an atmospheric coolant or can be recovered for heating an external installation, e.g. a greenhouse or the like.

Although the two embodiments described hereinbefore relate to an irradiated fuel element storage installation, it is clear that the invention is not limited thereto. Thus, the invention can also be applied to a transfer installation. In the same way, the invention can also be applied to products other than irradiated fuel assemblies, such as products constituting an irradiation hazard (radioactive waste, feed materials, sources), chemical contamination products (plutonium, liquid effluents), explosive products, etc.

We claim:

1. An installation for the storage of nuclear fuel assemblies, wherein it comprises a storage enclosure having side walls and adapted to contain nuclear fuel assemblies therebetween, at least one station for loading and unloading said nuclear fuel assemblies from above said side walls by lowering and raising said nuclear fuel assemblies, and a plurality of storage station, each station for loading and unloading and each of said storage stations being located in said enclosure, modules each of which receives nuclear fuel assemblies, each of these modules being located in one of the stations, the number of modules being less than that of the stations, lifting means for creating a fluid cushion below at least some of the modules in order to raise the latter within the enclosure and means for moving the modules between the different stations when they are raised by the lifting means, lateral rollers located on each module to cooperate with the adjacent modules.

2. An installation according to claim 1, wherein the loading and storage stations are aligned in rows in two different directions, the lifting means act independently in each of the rows and the means for displacing the modules act simultaneously on all the modules of the same row.

3. An installation according to claim 2, wherein the loading and storage stations are aligned in rows in two orthogonal directions, the storage enclosure then being rectangular and the modules square.

4. An installation according to claim 2, wherein means are provided for guiding the modules during their displacements between the different stations.

5. An installation according to claim 4, wherein the module guidance means comprises guide rails positioned on the periphery of the storage enclosure and between certain of the said rows, except the ends of the rows, and lateral rollers located on each module to cooperate with the guide rails.

6. An installation according to claim 5, wherein each module is equipped with four rollers positioned at the four corners of the square which it defines in cross-section, two of the rollers adjacent to the same side of the square being located in a horizontal plane displaced with respect to the two other rollers.

7. An installation according to claim 1, wherein the means for displacing the modules are constituted by jacks positioned outside of the enclosure at least at one end of at least one part of the said rows.

8. An installation according to claim 1, wherein the lifting means comprise parallel pipes positioned level with the floor or base of the enclosure and comprising uniformly distributed lifting nozzles, the pipes being supplied with a pressurized fluid.

9. An installation according to claim 5, wherein it also comprises a cooled fluid circuit.

10. An installation according to claim 9, wherein each module comprises an upper plate, means for supporting the fuel assemblies, a lower plate whose lower face is flat so as to permit the raising of the module by lifting means and an intermediate ferrule surrounding the fuel assemblies and defining the vicinity of each of the plates a passage enabling the cooled fluid to circulate in the ferrule.

11. An installation according to claim 10, wherein the rollers are carried by the lower plate.

12. An installation according to claims 10 or 11, wherein the means for supporting the fuel assemblies comprise a drop or fall absorber system for each of the assemblies.

13. An installation according to claim 10, wherein the upper plate is centrally provided with gripping means permitting the manipulation of the module via a trapdoor located in the top or ceiling of the enclosure at the loading and unloading station.

14. An installation according to claim 10, wherein the intermediate ferrule carries interconnected bars preventing swinging or rocking of the fuel assemblies.

15. An installation according to claim 10, wherein the lower plate has edges defining a reservoir on its upper face.

* * * * *